(12) United States Patent
Miao et al.

(10) Patent No.: US 9,075,200 B2
(45) Date of Patent: Jul. 7, 2015

(54) BIREFRINGENT CRYSTAL POLARIZATION BEAM SPLITTER ASSEMBLY

(71) Applicant: Futurewei Technologies, Inc., Plano, TX (US)

(72) Inventors: Rongsheng Miao, San Jose, CA (US); Tongqing Wang, Newark, CA (US); Changzheng Su, Santa Clara, CA (US); Xueyan Zheng, Andover, MA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 243 days.

(21) Appl. No.: 13/729,803

(22) Filed: Dec. 28, 2012

(65) Prior Publication Data

US 2014/0185139 A1  Jul. 3, 2014

(51) Int. Cl.
*G02B 5/30* (2006.01)
*G02B 27/28* (2006.01)

(52) U.S. Cl.
CPC ............ *G02B 5/3083* (2013.01); *G02B 27/283* (2013.01)

(58) Field of Classification Search
CPC ............................ G02B 5/3083; G02B 27/283
USPC ........................................ 359/489.01, 489.08
See application file for complete search history.

(56) References Cited

U.S. PATENT DOCUMENTS

| | | | |
|---|---|---|---|
| 6,370,287 B1 | 4/2002 | Liu | |
| 6,674,968 B1 * | 1/2004 | Xie | ................................. 398/79 |
| 6,822,793 B2 * | 11/2004 | Xie et al. | ................. 359/484.05 |
| 7,274,510 B2 * | 9/2007 | Wang et al. | .............. 359/484.05 |
| 2002/0005987 A1 * | 1/2002 | Wills et al. | .................... 359/497 |
| 2003/0113055 A1 * | 6/2003 | Zhao et al. | ....................... 385/16 |

(Continued)

FOREIGN PATENT DOCUMENTS

CN           1299980 A        6/2001

(Continued)

OTHER PUBLICATIONS

Foreign Communication From a Counterpart Application, PCT Application No. PCT/CN2013/090769, International Search Report dated Mar. 13, 2014, 3 pages.
Foreign Communication From a Counterpart Application, PCT Application No. PCT/CN2013/090769, Written Opinion dated Mar. 13, 2014, 4 pages.

*Primary Examiner* — Frank Font
(74) *Attorney, Agent, or Firm* — Conley Rose, P.C.; Grant Rodolph; Jonathan K. Polk

(57) ABSTRACT

An optical apparatus, comprising a polarization beam splitter (PBS) comprising a birefringent crystal having a front-end and a back-end, and an optical rotator positioned on the back-end of the birefringent crystal. Included is an optical apparatus comprising a PBS comprising a birefringent crystal and an optical rotator, wherein the PBS is configured to receive a multiplexed optical signal comprising a first polarized optical signal and a second polarized optical signal, wherein the second polarized optical signal is orthogonal to the first polarized optical signal, separate the first polarized optical signal from the second polarized optical signal using the birefringent crystal, and rotate the second polarized optical signal using the optical rotator such that the rotated second polarized optical signal is parallel to the first polarized optical signal. The PBS may further comprise only one lens, wherein the lens is positioned on the front-end of the birefringent crystal.

18 Claims, 4 Drawing Sheets

(56) References Cited

U.S. PATENT DOCUMENTS

2003/0175030 A1* 9/2003 Chen et al. .................. 398/85
2004/0105039 A1* 6/2004 Wills et al. ................... 349/9
2012/0207474 A1 8/2012 Inoue et al.

FOREIGN PATENT DOCUMENTS

| CN | 1450373 A | 10/2003 |
| CN | 101236304 A | 8/2008 |
| EP | 1103838 A2 | 5/2001 |

* cited by examiner

BIREFRINGENT CRYSTAL POLARIZATION BEAM SPLITTER ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An optical demultiplexer is a device that separates a combined light beam into a plurality of separated light beams. In some instances, the separated light beams have different wavelengths, and in other instances the separated light beams have the same wavelength, but different polarizations. Optical demultiplexers, particularly those that demultiplex optical signals having the same wavelength but different polarizations, are useful in a variety of optical telecommunication equipment, such as optical receivers.

SUMMARY

In one embodiment, the disclosure includes an optical apparatus, comprising a polarization beam splitter (PBS) comprising a birefringent crystal having a front-end and a back-end, and an optical rotator positioned on the back-end of the birefringent crystal.

In another embodiment, the disclosure includes an optical apparatus comprising a PBS comprising a birefringent crystal and an optical rotator, wherein the PBS is configured to receive a multiplexed optical signal comprising a first polarized optical signal and a second polarized optical signal, wherein the second polarized optical signal is orthogonal to the first polarized optical signal, separate the first polarized optical signal from the second polarized optical signal using the birefringent crystal, and rotate one of the first polarized optical signal and the second polarized optical signal using the optical rotator such that the rotated polarized optical signal is parallel to the un-rotated polarized optical signal.

In yet another embodiment, the disclosure includes a method comprising receive a multiplexed optical signal comprising a first polarized optical signal and a second polarized optical signal, wherein the second polarized optical signal is orthogonal to the first polarized optical signal, separate the first polarized optical signal from the second polarized optical signal using a birefringent crystal, and rotate one of the first polarized optical signal and the second polarized optical signal such that the rotated polarized optical signal is parallel to the un-rotated polarized optical signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
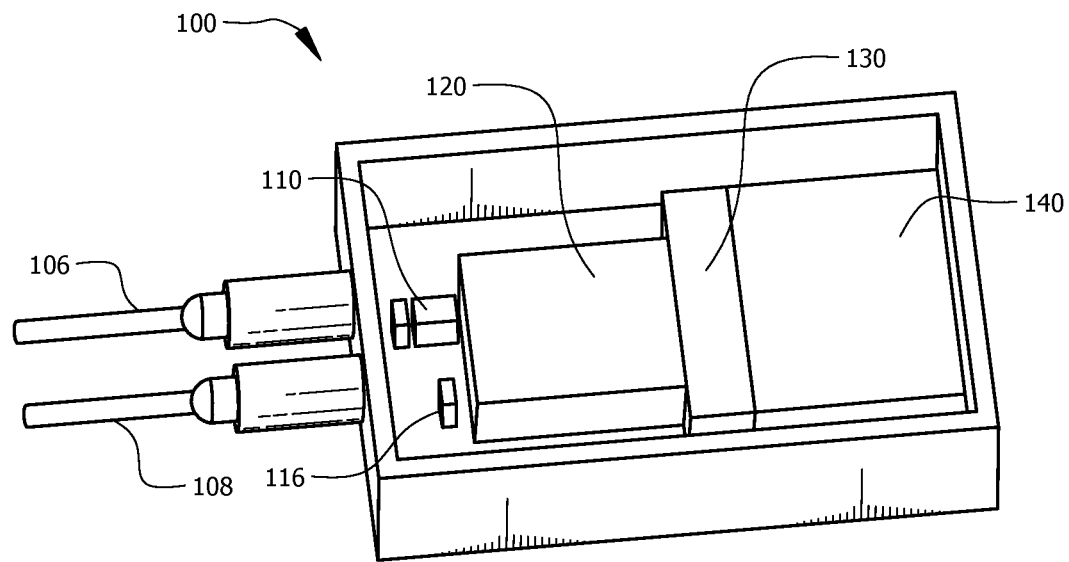
FIG. 1 shows an example of an optical receiver in accordance with various embodiments.

FIG. 1 shows an example of an optical receiver 100. The optical receiver 100 in FIG. 1 may be a coherent optical receiver. The optical receiver 100 includes a polarization beam splitter (PBS) 110, a planar lightwave circuit (PLC) 120, a photodetector (PD) optical unit 130, and a radio frequency (RF) unit 140. The PBS 110 receives a light signal that encodes data signals via the signal input 106 and splits the beam as described below. The PLC 120 guides the split light beams from the PBS 110 to the PD optical unit 130. The PD optical unit 130 includes one or more photodiodes to convert the received light into electrical signals. The electrical signals then are provided to the RF unit 140 where the electrical signal is amplified for further demodulation and data recovery. A local oscillator (LO) input 108 may be included in the optical receiver 100 to be mixed with the signal light. In some cases, the LO light may also need to pass through a PBS, such as PBS 110. In some embodiments, the PBS 110 may interface with a mixer instead of the PLC 120. Generally, the PBS 110 is a separate component from the PLC 120 or the mixer.

Figure 2:
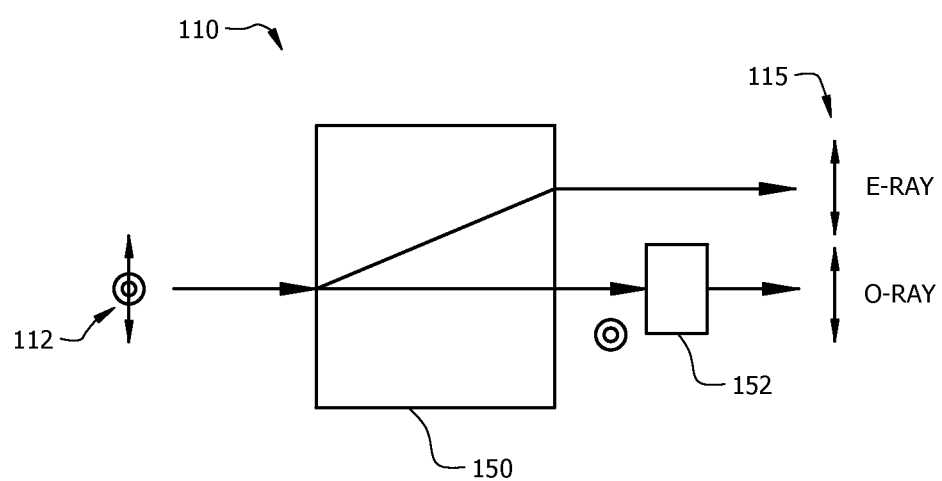
FIG. 2 shows a schematic diagram of a polarization beam splitter in accordance with various embodiments.
Figure 3:
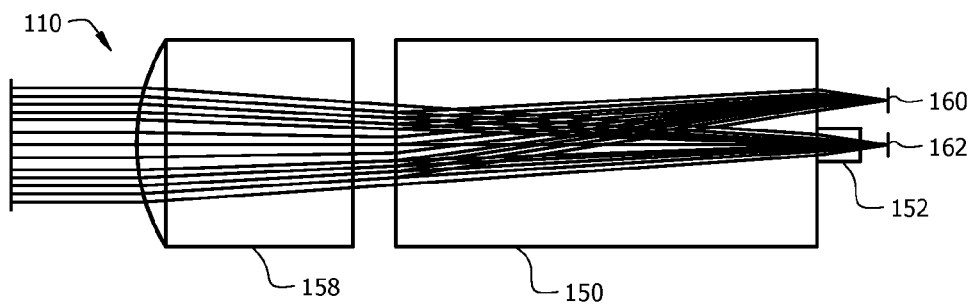
FIG. 3 illustrates the use of a lens to focus collimated light through the beam splitter in accordance with various embodiments.
Figure 4:
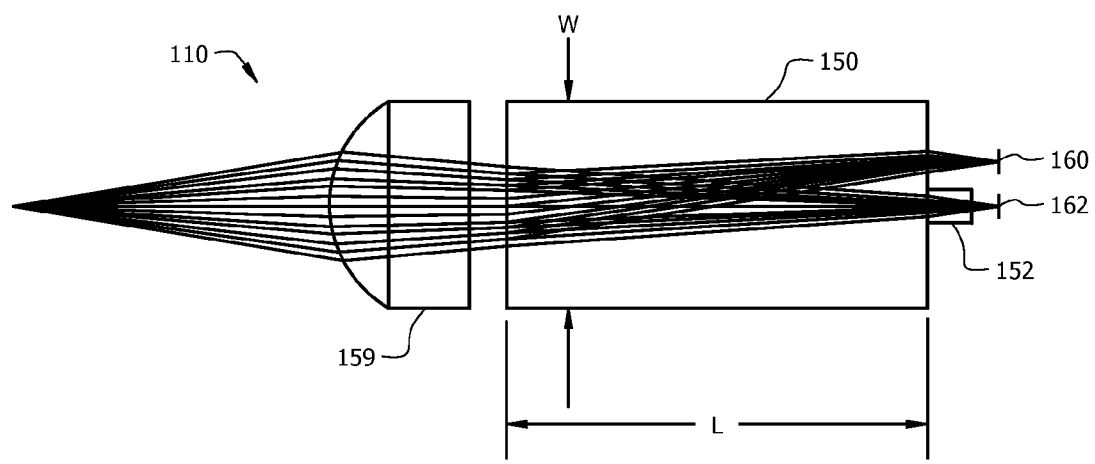
FIG. 4 illustrates the use of a lens to focus divergent light through the beam splitter in accordance with various embodiments.

FIGS. 2-4 schematically illustrate an embodiment of the PBS 110. As shown, the PBS 110 includes birefringent crystal 150 and a half wave plate 152. A lens (not shown in FIG. 2, but shown in FIGS. 3 and 4) may also be included to focus the light. In FIG. 2, the birefringent crystal 150 has a refractive index that depends on the polarization and propagation direction of light. The incoming light to the crystal may be a multiplexed signal that includes multiple light beams having different polarizations. Because the refractive index is different for each such light beam, the crystal causes the light to split (e.g., separate) into its constituent beams. In some implementations, the constituent beams are referred to as an extraordinary ray (E-ray), which has a polarization parallel to the page, and an ordinary ray (O-ray), which has a polarization perpendicular to the page and thus is perpendicular to the E-ray. The O-ray and E-ray beams may be further split into X and Y components. The birefringent crystal 150 may be constructed from any suitable material, such as yttrium orthovanadate ($YVO_4$).

The splitting angle between the E-ray and O-ray in the birefringent crystal 150 may be substantially smaller than prior art designs. For example, the splitting angle may be no more than about 60 degrees, no more than about 45 degrees, no more than about 30 degrees, no more than about 20 degrees, or no more than about 10 degrees. Most prior art designs split the E-ray and D-ray such that the splitting angle is about 90 degrees. The reduced splitting angle leads to smaller path length differentials between the E-ray path and the O-ray path. For example, the E-ray path length through the birefringent crystal 150 may be no more than 20 percent, no more than 10 percent, nor more than 5 percent, or no more than 1 percent longer than the O-ray path length through the birefringent crystal 150.

The symbol 112 in FIG. 2 denotes the polarizations of the constituent beams of the incoming light. The polarizations are orthogonal to each other. The birefringent crystal 150 splits the beam into the E-ray and the O-ray, where the E-ray polarization is orthogonal to the O-ray polarization. The half wave plate 152 causes the polarization of the light to be rotated 90 degrees to align the polarization orientations of the E-ray and the O-ray as depicted at 115 in FIG. 2. Alternatively, the first polarized optical signal can be rotated and the second polarized optical signal will not be rotated. The half wave plate 152 may be made from any suitable material such as crystalline quartz ($SiO_2$), calcite ($CaCO_3$), magnesium fluoride ($MgF_2$), sapphire ($Al_2O_3$), mica, etc. In some embodiments, the half wave plate 152 may be replaced by another type of optical rotator, such as a Faraday rotator.

FIGS. 3 and 4 illustrate the use of a lens 158, 159 to focus the light through the birefringent crystal 150 to a small point. In FIG. 3, the incoming light is collimated referring to light whose rays are parallel. The lens 158 shown in FIG. 3 causes the light to converge through the birefringent crystal 150 to points 160 and 162. In FIG. 4 the incoming light is divergent light referring to light whose arrays spread out as shown. A lens 159 (having a different shape from the lens 158 in FIG. 3) causes the diverging light rays to converge to points 160, 162.

Figure 5:
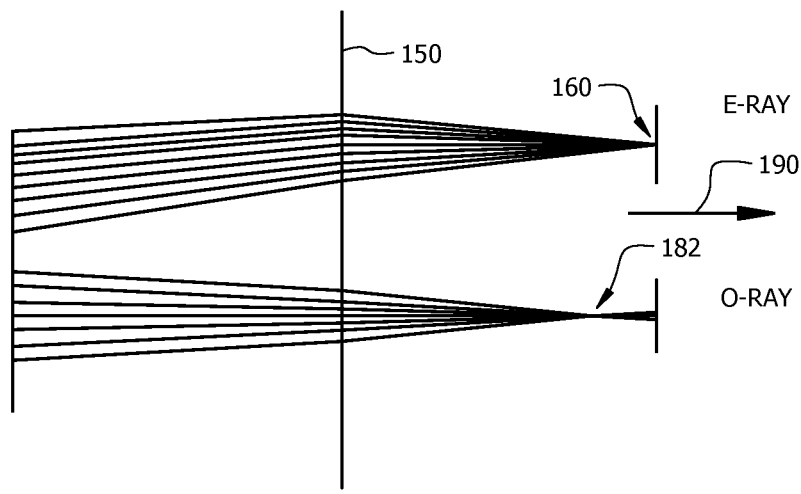
FIG. 5 depicts the effect of different focal lengths between the split O-ray and E-ray.

FIG. 5 illustrates the convergence caused by the lens for the E-ray and the O-ray without the use of a half wave plate. Without the half wave plate, the focal lengths of the rays are different. As a result, the O-ray converges to point 182 which is closer to the birefringent crystal 150 than the point 160 at which the E-ray converges. That is, the two rays converge at two different points along direction 190.

Figure 6:
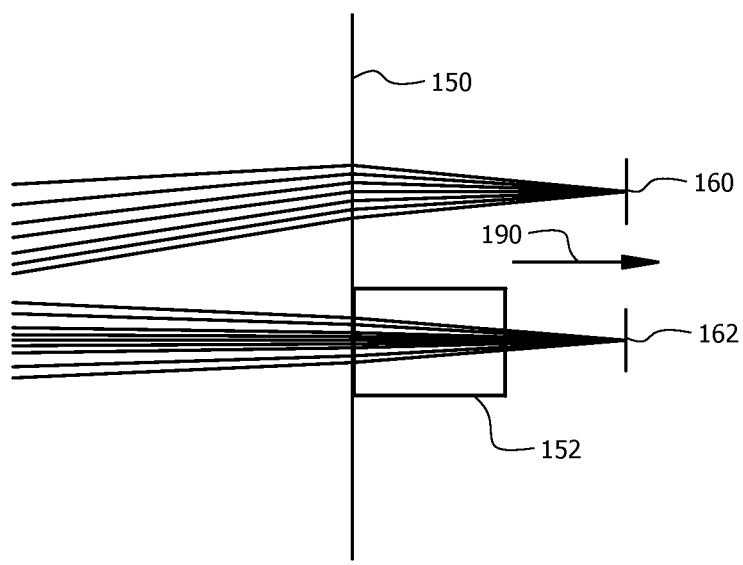
FIG. 6 illustrates how the different focal lengths can be corrected using a half-wave plate in accordance with various embodiments.

FIG. 6 illustrates the effect on the focal length of the O-ray from inclusion of a half wave plate 152. The half wave plate 152 extends the focal length so that the two rays converge at the some point 160, 162 along direction 190. The half wave plate 152 thus causes the polarizations of the two rays to be in the same direction as well as causes the focal lengths to substantially coincide (e.g. be substantially the same) for improved transmission to the subsequent PLC.

Because the PBS is constructed using a birefringent crystal, the PBS can be made substantially smaller than prior art designs. In some implementations, the length (L) and width (W) of the PBS (see FIG. 4) are less than one millimeter (mm), for example between 50 and 300 microns, whereas conventional beam splitters may have length and width dimensions in excess of one mm. Use of birefringent crystals for the beam splitter enables the distance as well as the differential of optical path between the E and O-rays (e.g. the pitch between the two rays) to be small enough so that a single lens 158, 159 can be used on the front-end of the beam splitter, rather than having two back end lenses as is typically the case for conventional beam splitters. In addition, the birefringent crystal allows a relatively small pitch to length ratio. For example, the PBS may have a pitch to length ratio of about 1:10 if using $YVO_4$ crystal. In addition, the splitting angle discussed above allows the pitch between the two optical signals, e.g. the E-ray and the O-ray, to be varied by increasing the length of the birefringent crystal.

Figure 7:
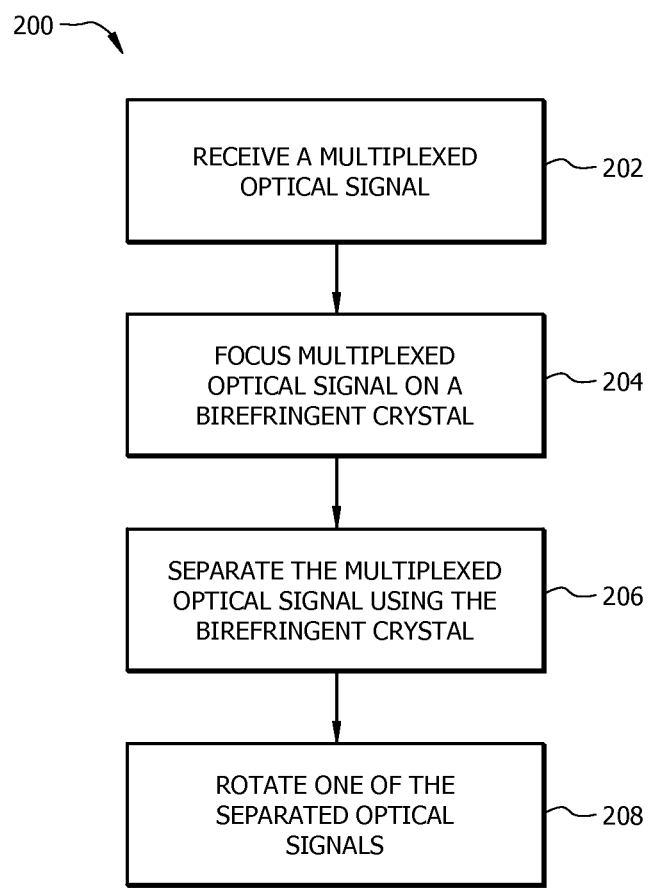
FIG. 7 is a flowchart of an example of a multiplexed optical signal separation method.

FIG. 7 is a flowchart of an example of a multiplexed optical signal separation method 200. The method 200 may be implemented in the optical receiver 100 by the PBS 110. The method 200 starts when a multiplexed optical signal is received at 202. The multiplexed optical signal may comprise a first polarized optical signal and a second polarized optical signal, wherein the second polarized optical signal is orthogonal to the first polarized optical signal. The multiplexed optical signal may be focused on a birefringent crystal, e.g. using lens 158, 159, at 204. The method 200 may continue with the first polarized optical signal being separated from the second polarized optical signal using the birefringent crystal at 206. The second polarized optical signal may then be rotated, e.g. using the half-wave plate 152, at 208 such that the rotated second polarized optical signal is parallel to the first polarized optical signal. Generally, the first polarized optical signal and the second polarized optical signal are not further focused after exiting the birefringent crystal. The separated optical signals may then be fed to a PLC, mixer, or other optical device.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical apparatus, comprising:
   a polarization beam splitter comprising:
     a birefringent crystal comprising a front end and a back end;
     an optical rotator positioned on the back end of the birefringent crystal; and
     a planar lightwave circuit positioned on the back end of the birefringent crystal such that the optical rotator is positioned between part of the birefringent crystal and the planar lightwave circuit.

2. The optical apparatus of claim 1, wherein the birefringent crystal comprises yttrium orthovanadate.

3. The optical apparatus of claim 1, wherein each of a length dimension and a width dimension of the birefringent crystal is from about 50 microns to about 300 microns.

4. The optical apparatus of claim 1, wherein the polarization beam splitter further comprises only one lens, and wherein the lens is positioned on the front end of the birefringent crystal.

5. The optical apparatus of claim 4, wherein the polarization beam splitter consists of the birefringent crystal, the optical rotator, and the lens, and wherein the optical rotator is either a half-wave plate or a Faraday rotator.

6. The optical apparatus of claim 1, wherein the polarization beam splitter does not comprise any lenses on the back end of the birefringent crystal.

7. An optical apparatus comprising:
   a polarization beam splitter comprising:
     a birefringent crystal;
     an optical rotator; and
     only one lens coupled to the birefringent crystal, wherein the polarization beam splitter is configured to:
       receive a multiplexed optical signal comprising a first polarized optical signal and a second polarized optical signal, wherein the second polarized optical signal is orthogonal to the first polarized optical signal;
       separate the first polarized optical signal from the second polarized optical signal using the birefringent crystal; and
       rotate one of the first polarized optical signal and the second polarized optical signal using the optical rotator such that the rotated polarized optical signal is parallel to the un-rotated polarized optical signal.

8. The optical apparatus of claim 7, wherein the first polarized optical signal is an extraordinary ray, and wherein the second polarized optical signal is an ordinary ray.

9. The optical apparatus of claim 7, wherein the multiplexed optical signal comprises collimated light, and wherein the polarization beam splitter is further configured to focus the multiplexed optical signal on the birefringent crystal using the lens.

10. The optical apparatus of claim 7, further comprising a planar lightwave circuit, wherein the un-rotated polarized optical signal and the rotated polarized optical signal are fed into the planar lightwave circuit.

11. The optical apparatus of claim 7, further comprising an optical mixer, wherein the un-rotated polarized optical signal and the rotated polarized optical signal are fed into the optical mixer.

12. The optical apparatus of claim 7, wherein the multiplexed optical signal comprises divergent light, and wherein the polarization beam splitter is further configured to focus the multiplexed optical signal on the birefringent crystal using the lens.

13. The optical apparatus of claim 12, wherein the polarization beam splitter has a pitch between the first polarized optical signal and the second polarized optical signal, wherein the polarization beam splitter has a length defined by a distance between a front of the birefringent crystal and a back of the birefringent crystal, and wherein the polarization beam splitter has a pitch-to-length ratio of about 1:10 when using a yttrium orthovanadate crystal.

14. The optical apparatus of claim 10, wherein the first polarized optical signal separates from the second polarized optical signal within the birefringent crystal at an angle less than about 30 degrees.

15. The optical apparatus of claim 10, wherein the rotated polarized optical signal and the un-rotated polarized optical signal have substantially the same focal length relative to a back end of the birefringent crystal.

16. The optical apparatus of claim 10, wherein the first polarized optical signal has a first path length, wherein the second polarized optical signal has a second path length, and wherein the first path length is no more than 20 percent longer than the second path length.

17. A method comprising:
   receiving a multiplexed optical signal comprising a first polarized optical signal and a second polarized optical signal, wherein the second polarized optical signal is orthogonal to the first polarized optical signal;
   separating, at an angle less than about 10 degrees, the first polarized optical signal from the second polarized optical signal using a birefringent crystal; and
   rotating one of the first polarized optical signal and the second polarized optical signal such that the rotated polarized optical signal is parallel to the un-rotated polarized optical signal.

18. The method claim 17, further comprising focusing the multiplexed optical signal on the birefringent crystal using a lens, wherein the rotated polarized optical signal and the un-rotated polarized optical signal are not further focused after exiting the birefringent crystal.

* * * * *